3,096,335
LOWER ALKYL 1-(PHENYLAMINOALKYL)-4-PHENYL-4-PIPERIDYL KETONES
Bill Elpern, Walnut Creek, Calif., assignor to Sterling Drug Inc., New York, N.Y., a corporation of Delaware
No Drawing. Filed May 12, 1958, Ser. No. 734,389
9 Claims. (Cl. 260—293.4)

This invention relates to compositions of matter of the class of substituted piperidines and to processes for their preparation.

The invention here resides in the concept of a composition having a molecular structure in which a (monocarbocyclic-aryl)amino-(polycarbon-lower-alkyl) radical is attached to the nitrogen atom of the piperidine ring of lower-alkyl 4-phenyl-4-piperidyl ketones and in a process for physically embodying such concept.

The physical embodiments of my invention have been tested by standard pharmacological evaluation procedures in rats and found to possess analgesic activity.

Among the compounds of my invention are those which in free base form have the structural Formula I

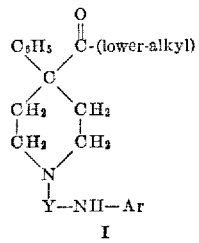

I where Y is a polycarbon-lower-alkylene radical and Ar is a monocarbocyclic-aryl radical having six ring-carbon atoms. These compounds also can be named as 1-[(monocarbocyclic-aryl)amino-(polycarbon-lower-alkyl)]-4-phenyl-4-(lower-alkanoyl)piperidines.

The term "lower-alkyl," as used herein, means alkyl radicals having one to six carbon atoms, inclusive, and is illustrated by methyl, ethyl, n-propyl, isopropyl, n-butyl, isobutyl, 2-butyl, n-amyl, n-hexyl, and the like.

The term "monocarbocyclic-aryl," as used herein means aryl radicals having six ring-carbon atoms or, in other words, aryl radicals of the benzene series, and is illustrated by the unsubstituted phenyl radical and phenyl radicals bearing substituents, preferably one to three, illustrated by nitro, amino, (lower-alkyl)amino, (lower-alkanoyl)amino, lower-alkoxy, lower-alkylmercapto, lower-alkylsulfonyl, hydroxy, halo, and the like. Furthermore, these substituents can be in any of the available positions of the phenyl nucleus, and where more than one substituent, they can be the same or different and they can be in any of the various position combinations relative to each other. The (lower-alkyl)amino, (lower-alkanoyl)amino, lower-alkoxy, lower-alkylmercapto and lower-alkylsulfonyl substituents each have preferably from one to six carbon atoms which can be arranged as straight or branched chains.

The term "polycarbon-lower-alkylene," as used herein, means alkylene radicals having from two to six carbon atoms, inclusive, and preferably having from two to four carbon atoms, and is illustrated by

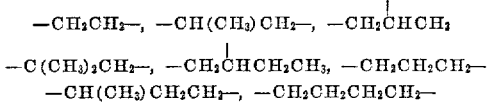

and the like.

The lower-alkyl 1-[(monocarbocyclic-aryl)amino-(polycarbon-lower-alkyl)]-4-phenyl-4-piperidyl ketones are prepared by reacting a lower-alkyl 4-phenyl-4-piperidyl ketone with a (monocarbocyclic-aryl)amino-(polycarbon-lower-alkylating) agent, said agent being preferably a (monocarbocyclic - aryl)amino -(polycarbon-lower-alkyl) ester of an acid selected from the group consisting of a strong inorganic acid and an organic sulfonic acid. The reaction is carried out generally by heating, at a temperature between about 50° C. and 150° C., the lower-alkyl 4-phenyl-4-piperidyl ketone with the (monocarbocyclic-aryl)amino-(polycarbon-lower-alkyl) ester, preferably the bromide, in the presence or absence of a suitable solvent, but preferably in the presence of a solvent such as a lower-alkanol. Illustrative of the reaction are: the preparation of ethyl 1-(3-phenylaminopropyl)-4-phenyl-4-piperidyl ketone by heating ethyl 4-phenyl-4-piperidyl ketone with 3-phenylaminopropyl bromide; and the preparation of ethyl 1-[2-(4-aminophenylamino)ethyl]-4-phenyl-4-piperidyl ketone by heating ethyl 4-phenyl-4-piperidyl ketone with 2-(4-aminophenylamino)ethyl chloride. These preparations are carried out preferably in refluxing n-butanol with stirring in the presence of an alkaline agent such as sodium carbonate to neutralize the hydrogen halide formed by the reaction. The products are isolated in free base form or in the form of their acid-addition salts.

An alternative procedure for preparing the lower-alkyl 1 - [(monocarbocyclic - aryl)amino - (polycarbon - lower-alkyl)]-4-phenyl-4-piperidyl ketones consists of introducing stepwise the 1-[(monocarbocyclic-aryl)amino-(polycarbon-lower-alkyl)] substituent onto the piperidine nucleus by reacting a lower-alkyl 4-phenyl-4-piperidyl ketone with a hydroxy-(polycarbon-lower-alkyl) halide, HO—Y-halogen, to form a lower-alkyl 1-[hydroxy-(polycarbon-lower-alkyl)]-4-phenyl-4-piperidyl ketone; reacting this 1-(hydroxyalkyl) compound with a halogenating agent, e.g., thionyl chloride, phosphorus oxychloride, phosphorus tribromide, to yield the corresponding lower-alkyl 1-[halo-(polycarbon-lower-alkyl)]-4-piperidyl ketone having the structural Formula II

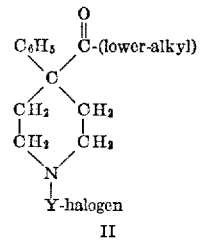

II and then reacting the 1-(haloalkyl) compound with a monocarbocyclic-arylamine having the formula Ar—NH$_2$. The last step is generally carried out between about 70° C. and 160° C., preferably in a suitable solvent, e.g., n-butanol, 2-ethoxyethanol. Illustrative of this procedure are the following preparations: ethyl 1-[2-(4-nitrophenylamino)ethyl]-4-phenyl-4-piperidyl ketone by reacting ethyl 4-phenyl-4-piperidyl ketone with 2-hydroxyethyl chloride, reacting the resulting ethyl 1-(2-hydroxyethyl)-4-phenyl-4-piperidyl ketone with thionyl chloride and heating the ethyl 1-(2-chloroethyl)-4-phenyl-4-piperidyl ketone thus formed with 4-nitroaniline; and the preparation of ethyl 1-[3-(4-n-butylaminophenylamino)propyl]-4-phenyl-4-piperidyl ketone by reacting ethyl 4-phenyl-4-piperidyl ketone with 3-hydroxypropyl chloride, reacting the resulting ethyl 1-(3-hydroxypropyl)-4-phenyl-4-piperidyl ketone with phosphorus tribromide and reacting the ethyl 1-(3-bromopropyl)-4-phenyl-4-piperidyl ketone thus formed with 4-n-butylaminoaniline.

My lower-alkyl 1 - [(monocarbocyclic-aryl)amino-(polycarbon-lower alkyl)]-4-phenyl-4-piperidyl ketones are useful in the free base form or in the form of acid-addition salts, and both forms are within the purview of the invention, and in fact, are considered to be one and the same invention. The acid-addition salts are simply a more convenient form for use; and, in practice, use of the salt form inherently amounts to use of the base form.

As used in the appended claims, unless specifically designated otherwise, the term "lower-alkyl 1-[(monocarbocyclic-aryl)amino - (polycarbon-lower-alkyl)] - 4-phenyl-4-piperidyl ketone" means both the free base form and the acid-addition salt form of the molecular structure recited. The acids which can be used to prepare the acid-addition salts are preferably those which produce, when combined with the free base, pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to employ the hydrochloride, hydrobromide and methanesulfonate salts. However, other appropriate pharmacologically acceptable salts within the scope of the invention are those derived from mineral acids such as hydriodic acid, nitric acid, phosphoric acid, and sulfuric acid; and organic acids such as acetic acid, citric acid, tartaric acid, lactic acid, enthanesulfonic acid, quinic acid, and the like, giving the hydriodide, nitrate, phosphate, sulfate, acetate, citrate, tartrate, lactate, ethanesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacologically acceptable salt by ion exchange procedures.

The molecular structures of the compounds of my invention are established by their mode of synthesis and corroborated by the correspondence of calculated and found values for the elementary analyses for representative examples.

The following examples will further illustrate the invention without, however, limiting it thereto.

*Example 1*

A. *Lower-alkyl 1 - benzyl - 4 - phenyl - 4 - piperidyl ketones.*—The preparation of these intermediate compounds is illustrated by the following preparation of ethyl 1-benzyl-4-phenyl-4-piperidyl ketone: A solution of ethyl magnesium bromide was prepared from 327 g. of ethyl bromide and 72.9 g. of magnesium in two liters of ether. 1-benzyl-4-cyano-4-phenylpiperidine hydrochloride, 312.8 g., was converted into its free base and taken up in one liter of toluene. The solution was added to the Grignard reagent and the resultant mixture was subjected to downward distillation until the ether had been removed and the still-head temperature had reached 105° C. During this time the mixture turned gray-green and a solid separated. After the mixture had been refluxed an additional four hours, it was allowed to stand overnight at room temperature and then poured into a mixture of 600 ml. of concentrated hydrochloric acid and two liters of water. The acidic solution was heated for three hours on a steam bath, cooled and made basic with ammonium hydroxide. Two liters of ether were added to the basic mixture which was stirred until all of the solid dissolved.

The ether layer was separated; the ether was removed from the organic layer by distilling in vacuo; and the residual oil was subjected to an azeotropic distillation with a small quantity of benzene. The residual oil was taken up in ether, filtered free of a small quantity of solid and concentrated in vacuo again to remove the ether. There was thus obtained 289.6 g. (94.3% theory) of ethyl 1-benzyl-4-phenyl-4-piperidyl ketone, an oil. On standing, this product solidified.

Other lower-alkyl 1-benzyl-4-phenyl-4-piperidyl ketones can be prepared following the above procedure for the preparation of ethyl 1-benzyl-4-phenyl-4-piperidyl ketone using the appropriate lower-alkyl magnesium halide in place of ethyl magnesium bromide, as follows: methyl 1-benzyl-4-phenyl-4-piperidyl ketone using methyl magnesium iodide; n-propyl 1-benzyl-4-phenyl-4-piperidyl ketone using n-propyl magnesium bromide; isobutyl 1-benzyl-4-phenyl-4-piperidyl ketone using isobutyl magnesium bromide; n-hexyl 1-benzyl-4-phenyl-4-piperidyl ketone using n-hexyl magnesium chloride; and the like.

B. *Lower-alkyl 4 - phenyl-4-piperidyl ketones.*—The preparation of these intermediate compounds is illustrated by the following preparation of ethyl 4-phenyl-4-piperidyl ketone: A solution containing 289.6 g. of ethyl 1-benzyl-4-phenyl-4-piperidyl ketone in a mixture of one liter of absolute ethanol and 400 cc. of acetic acid was treated with hydrogen under pressure using 40 g. of 10% palladium on charcoal to yield the corresponding debenzylated compound. This catalytic reduction was carried out at 66° C. and was completed in about six and one-half hours. The catalyst was removed by filtration and the filtrate concentrated by distilling in vacuo. The remaining oil was extracted with ether; the ether solution was dried over anhydrous sodium sulfate; the ether was removed by distillation in vacuo; and the residual oil was distilled in vacuo whereupon there was obtained 85 g. of light yellow oil distilling at 95–130° C. at 0.03 mm. Redistillation of this oil yielded 80.7 g. (40% yield) of ethyl 4-phenyl-4-piperidyl ketone, B.P. 96–106° C. at 0.03 mm., $n_D^{26°}=1.5430$. The hydrochloride of this compound melted at 208.8–211.0° C. (corr.) when recrystallized twice from ethyl acetate-ethanol.

*Analysis.*—Calcd. for $C_{14}H_{19}NO \cdot HCl$: C, 66.24; H, 7.94; Cl, 13.97. Found: C, 65.96; H, 7.79; Cl, 13.72.

Other lower-alkyl 4-phenyl-4-piperidyl ketones can be prepared following the above procedure for the preparation of ethyl 4-phenyl-4-piperidyl ketone using the appropriate lower-alkyl 1-benzyl-4-phenyl-4-piperidyl ketone in place of ethyl 1-benzyl-4-phenyl-4-piperidyl ketone as follows: methyl 4-phenyl-4-piperidyl ketone using methyl 1-benzyl-4-phenyl-4-piperidyl ketone; n-propyl 4-phenyl-4-piperidyl ketone using n-propyl 1-benzyl-4-phenyl-4-piperidyl ketone; isobutyl 4-phenyl-4-piperidyl ketone using isobutyl 1-benzyl-4-phenyl-4-piperidyl ketone; n-hexyl 4-phenyl-4-piperidyl ketone using n-hexyl 1-benzyl-4-phenyl-4-piperidyl ketone; and the like.

C. *Lower - alkyl 1-[(monocarbocyclic - aryl)amino-(polycarbon-lower-alkyl)]-4-phenyl - 4 - piperidyl ketones.*—The preparation of these compounds is illustrated by the following preparation of ethyl 1-(2-phenylaminoethyl)-4-phenyl-4-piperidyl ketone in free base and acid-addition salt forms: N-(2-hydroxyethyl) aniline, 137.2 g., was cooled to 0° C. and 425 ml. of 48% hydrobromic acid was added at such a rate that the temperature was maintained below 10° C. at all times. The mixture was then allowed to stand at room temperature for about three days and was distilled until about 300 ml. of distillate had been collected. The residue was poured into a large crystallizing dish, placed in a vacuum desiccator and evacuated using a water aspirator for about two hours. The solid that formed was collected and crystallized several times from ethanol-benzene. There was thus obtained 93 g. (32% yield) of 2-phenylaminoethyl bromide as its hydrobromide, M.P. 138–139° C.

A mixture containing 10.8 g. of ethyl 4-phenyl-4-piperidyl ketone, 14 g. of 2-phenylaminoethyl bromide hydrobromide and 12 g. of sodium carbonate was refluxed in 100 ml. of n-butanol for about twenty-four hours. The reaction mixture was filtered; dry ice was added to the filtrate; and the small amount of solid that separated was removed by filtration. The filtrate was concentrated in vacuo to dryness and the residue was taken up in 200 ml. of isopropanol containing 5 ml. of concentrated hydrochloric acid. The solution was concentrated slightly whereupon crystals strated to form. The mixture was allowed to cool and the crytals that separated were collected and recrystallized from isopropyl alcohol to give 7 g. of ethyl 1-(2-phenylaminoethyl)-4-phenyl-4-piperidyl ketone hydrochloride, M.P. 211–212.8° C. (corr.).

*Analysis.*—Calcd. for $C_{22}H_{28}N_2O \cdot HCl$: Cl, 9.51; N, 7.52. Found: Cl, 9.45; N, 7.32.

The above-described preparation can also be carried out using 2-phenylaminoethyl bromide in free base form and only one-half as much sodium carbonate. Alternatively, this preparation can be carried out using other esters such as 2-phenylaminoethyl chloride, 2-phenylaminoethyl iodide or 2-phenylaminoethyl para-toluenesulfonate in place of 2-phenylaminoethyl bromide.

Ethyl 1-(2-phenylaminoethyl)-4-phenyl-4-piperidyl ketone in the form of its free base is obtained by dissolving a sample of the above-described hydrochloride in water, treating the aqueous solution with sodium hydroxide solution, extracting the liberated base with ether, drying the ether extract with anhydrous sodium sulfate and evaporating the ether solution to dryness in vacuo.

Following the above procedure but using hydrogen bromide in ether instead of hydrochloric acid, there was obtained ethyl 1-(2-phenylaminoethyl)-4-phenyl-4-piperidyl ketone hydrobromide, M.P. 209.0–211.2° C. (corr.).

*Analysis.*—Calcd. for $C_{22}H_{28}N_2O \cdot HBr$: C, 63.31; H, 7.00; Br, 19.15. Found: C, 63.46; H, 6.95; Br, 19.12.

Ethyl 1-(2-phenylaminoethyl)-4-phenyl-4-piperidyl ketone in the form of its methanesulfonate salt was formed by adding an acetone solution of methanesulfonic acid to a solution of the free base in ether, filtering the resulting precipitate and recrystallizing the precipitate twice from isopropyl alcohol. There was thus obtained ethyl 1-(2-phenylaminoethyl)-4-phenyl-4-piperidyl ketone methanesulfonate, M.P. 164.2–165.0° C. (corr.).

*Analysis.*—Calcd. for $C_{22}H_{28}N_2O \cdot CH_3SO_3H$: C, 63.86; H, 7.45; $CH_3SO_3H$, 22.22. Found: C, 63.95; H, 7.77; $CH_3SO_3H$, 22.67.

Pharmacological evaluation of ethyl 1-(2-phenylaminoethyl)-4-phenyl-4-piperidyl ketone hydrochloride in aqueous solution administered subcutaneously by the rat thermal stimulus method of Bass and Vander Brook has shown that this compound is approximately four and one-half times as active an analgesic as meperidine hydrochloride.

Other representative lower-alkyl 1-[(monocarbocyclic-aryl)amino - (polycarbon-lower-alkyl)]-4-phenyl-4-piperidyl ketones than can be prepared following the above procedure for the preparation of ethyl 1-(2-phenylaminoethyl)-4-phenyl-4-piperidyl ketone using the appropriate lower-alkyl 4-phenyl-4-piperidyl ketone and (monocarbocyclic-aryl)amino-(polycarbon-lower-alkyl) halide are the following compounds of Examples 2–12, inclusive. These compounds can be isolated in their free base form or in the form of their acid-addition salts, preferably their hydrochlorides, as illustrated.

Example 2

Methyl 1-(2-phenylaminoethyl)-4-phenyl-4-piperidyl ketone hydrochloride is obtained following the procedure described in Example 1C using methyl 4-phenyl-4-piperidyl ketone and 2-phenylaminoethyl bromide.

Example 3

Isopropyl 1-(2-phenylaminoethyl)-4-phenyl-4-piperidyl ketone hydrochloride is obtained following the procedure described in Example 1C using isopropyl 3-phenyl-4-piperidyl ketone and 2-phenylaminoethyl bromide.

Example 4

Isobutyl 1 - (2-phenylaminoethyl)-4-phenyl-4-piperidyl ketone hydrochloride is obtained following the procedure described in Example 1C using isobutyl 4-phenyl-4-piperidyl ketone and 2-phenylaminoethyl bromide.

Example 5 n-Hexyl 1 - (2-phenylaminoethyl)-4-phenyl-4-piperidyl ketone hydrochloride is obtained following the procedure described in Example 1C using n-hexyl 4-phenyl-4-piperidyl ketone and 2-phenylaminoethyl bromide.

Example 6

Ethyl 1 - (4 - phenylaminobutyl)-4-phenyl-4-piperidyl ketone hydrochloride is obtained following the procedure described in Example 1C using ethyl 4-phenyl-4-piperidyl ketone and 4-phenylaminobutyl bromide.

Example 7

Ethyl 1-[2-(4-methoxyphenylamino) ethyl]-4-phenyl-4-piperidyl ketone hydrochloride is obtained following the procedure described in Example 1C using ethyl 4-phenyl-4-piperidyl ketone and 2-(4-methoxyphenylamino)ethyl chloride.

Example 8

Methyl 1 - [3-(3,4-dimethoxyphenylamino)propyl]-4-phenyl-4-piperidyl ketone hydrochloride is obtained following the procedure described in Example 1C using methyl 4-phenyl-4-piperidyl ketone and 3-(3,4-dimethoxyphenylamino)propyl bromide.

Example 9 n-Propyl 1-[2-(3-ethoxyphenylamino)ethyl]-4-phenyl-4-piperidyl ketone hydrochloride is obtained following the procedure described in Example 1C using n-propyl 4-phenyl-4-piperidyl ketone and 2-(3-ethoxyphenylamino) ethyl iodide.

Example 10

Ethyl 1 - [2-(4-n-butylmercaptophenylamino)ethyl]-4-phenyl-4-piperidyl ketone hydrochloride is obtained following the procedure described in Example 1C using ethyl 4-phenyl-4-piperidyl ketone and 2-(4-n-butylmercaptophenylamino)ethyl bromide.

Example 11

Ethyl 1 - [2 - (4-n-butylsulfonylphenylamino)ethyl]-4-phenyl-4-piperidyl ketone hydrochloride is obtained following the procedure described in Example 1C using ethyl 4-phenyl-4-piperidyl ketone and 2-(4-n-butylsulfonylphenylamino)ethyl bromide.

Example 12

Ethyl 1-[3-(4-hydroxyphenylamino)propyl]-4-phenyl-4-piperidyl ketone hydrochloride is obtained following the procedure described in Example 1C using ethyl 4-phenyl-4-piperidyl ketone and 3-(4-hydroxyphenylamino)propyl bromide.

Example 13

*Ethyl 1-(3-phenylaminopropyl)-4 - phenyl - 4 - piperidyl ketone.*—This preparation was carried out following the procedure described above for Example 1C using 5.4 g. of ethyl 4-phenyl-4-piperidyl ketone, 7.4 g. of 3-phenylaminopropyl bromide hydrobromide (prepared from 15.1 g. of N-(3-hydroxypropyl)aniline and 45 cc. of 48% hydrobromic acid), 6 g. of sodium carbonate and 50 cc. of n-butanol. There was thus obtained 3.4 g. (32% yield) of the product, ethyl 1-(3-phenylaminopropyl)-4-phenyl-4-piperidyl ketone dihydrochloride, M.P. 206.6–212.8° C. (corr.) with decomposition, when recrystallized from ethanol-ethyl acetate.

*Analysis.*—Calcd. for $C_{23}H_{30}N_2O \cdot 2HCl$: C, 65.26; H, 7.62; Cl, 16.75. Found: C, 65.03; H, 7.77; Cl, 16.55.

Ethyl 1-(3-phenylaminopropyl)-4-phenyl-4-piperidyl ketone in free base form is prepared from its hydrochloride according to the procedure described above in Example 1C for the conversion of ethyl 1-(2-phenylaminoethyl)-4-phenyl-4-piperidyl ketone hydrochloride into its free base.

Pharmacological evaluation of ethyl 1-(3-phenylaminopropyl)-4-phenyl-4-piperidyl ketone dihydrochloride in aqueous solution administered subcutaneously by the rat thermal stimulus method of Bass and Vander Brook has shown that this compound is approximately six times as active an analgesic as meperidine hydrochloride.

Example 14

*Ethyl 1-[2-(4-methylphenylamino)ethyl]-4-phenyl-4-piperidyl ketone.*—This preparation was carried out following the procedure described in Example 1C using 5.4 g. of ethyl 4-phenyl-4-piperidyl ketone, 7.4 g. of 2-(4-methylphenylamino)ethyl bromide hydrobromide (prepared from 30.2 g. of 2-(4-methylphenylamino)ethanol and 90 cc. of 48% hydrobromic acid), 50 cc. of n-butanol and 6 g. of sodium carbonate. There was thus obtained 2.1 g. (19.8% yield) of the product, ethyl 1-[2-(4-methylphenylamino)ethyl]-4-phenyl-4-piperidyl ketone dihydrochloride, M.P. 198.4–200.2° C. (corr.) when recrystallized several times from ethanolethyl acetate.

*Analysis.*—Calcd. for $C_{23}H_{30}N_2O \cdot 2HCl$: C, 65.26; H, 7.62; Cl, 16.75. Found: C, 65.00; H, 7.49; Cl, 16.75.

Ethyl 1-[2-(4-methylphenylamino)ethyl]-4-phenyl-4-piperidyl ketone in free base form is prepared from its dihydrochloride according to the procedure described above in Example 1C for the conversion of ethyl 1-(2-phenylaminoethyl)-4-phenyl-4-piperidyl ketone hydrochloride into its free base.

Pharmacological evaluation of ethyl 1-[2-(4-methylphenylamino)ethyl]-4-phenyl-4-piperidyl ketone dihydrochloride in aqueous solution administered subcutaneously by the rat thermal stimulus method of Bass and Vander Brook has shown that this compound is approximately three and one-half times as active an analgesic as meperidine hydrochloride.

Example 15

A. *Lower-alkyl 1-(hydroxyalkyl)-4-phenyl-4-piperidyl ketones.*—The preparation of these intermediate compounds is illustrated by the following synthesis of ethyl 1-(2-hydroxyethyl)-4-phenyl-4-piperidyl ketone: A mixture containing 36 g. of ethyl 4-phenyl-4-piperidyl ketone, 22 g. of 2-hydroxyethyl chloride, 32 g. of sodium carbonate and 150 cc. of n-butanol was refluxed for twenty-four hours. The reaction mixture was cooled, filtered and the filtrate concentrated in vacuo to yield an oily residual material. The oil was taken up in ether; the ether solution was filtered; and the ether solution when treated with Dry Ice yielded no precipitate. To the ether solution was then added a solution of hydrogen chloride in ether whereupon there separated a white gummy material which solidified. The white solid was recrystallized several times from ethyl acetate-ethanol to yield 35.5 g. (71.7% yield) of ethyl 1-(2-hydroxyethyl)-4-phenyl-4-piperidyl ketone hydrochloride, M.P. 187.0–190.0° C. (corr.).

*Analysis.*—Calcd. for $C_{16}H_{23}NO_2 \cdot HCl$: C, 64.51; H, 8.12; Cl, 11.90. Found: C, 64.53; H, 8.20; Cl, 11.89.

Following the above procedure but using the appropriate lower-alkyl 4-phenyl-4-piperidyl ketone and hydroxyalkyl halide, there is obtained the following compounds: methyl 1-(4-hydroxybutyl)-4-phenyl-4-piperidyl ketone using methyl 4-phenyl-4-piperidyl ketone and 4-hydroxybutyl chloride; ethyl 1-(3-hydroxypropyl)-4-phenyl-4-piperidyl ketone using ethyl 4-phenyl-4-piperidyl ketone and 3-hydroxypropyl chloride; isobutyl 1-(2-hydroxypropyl)-4-phenyl-4-piperidyl ketone using isobutyl 4-phenyl-4-piperidyl ketone and 2-hydroxypropyl chloride; n-hexyl 1-(3-hydroxypropyl)-4-phenyl-4-piperidyl ketone using n-hexyl 4-phenyl-4-piperidyl ketone and 3-hydroxypropyl bromide; and the like. These compounds can be isolated in their free base form or in the form of their acid-addition slats, preferably the hydrochlorides.

B. *Lower-alkyl 1-(haloalkyl)-4-phenyl-4-piperidyl ketones.*—The preparation of these intermediate compounds is illustrated by the following synthesis of ethyl 1-(2-chlorethyl)-4-phenyl-4-piperidyl ketone: To a mixture containing 32.5 g. of ethyl 1-(2-hydroxyethyl)-4-phenyl-4-piperidyl ketone and two drops of pyridine in 450 ml. of benzene was added with stirring over a period of about fifteen minutes 13.1 g. of thionyl chloride. The reaction mixture was then refluxed for about one and one-half hours and then allowed to cool. The white precipitate was collected and recrystallized from ethanol yielding 31.7 g. (92% yield) of ethyl 1-(2-chloroethyl)-4-phenyl-4-piperidyl ketone as its hydrochloride, M.P. 231.0–232.4° C. (corr.).

*Analysis.*—Calcd. for $C_{16}H_{22}ClNO \cdot HCl$: Cl, 22.42; N, 4.43. Found: Cl, 22.20; N, 4.42.

Following the above procedure but using the appropriate lower-alkyl 1-(hydroxyalkyl)-4-phenyl-4-piperidyl ketone and halogenating agent, there is obtained the following compounds: methyl 1-(4-chlorobutyl)-4-phenyl-4-piperidyl ketone, ethyl 1-(3-chloropropyl)-4-phenyl-4-piperidyl ketone, ethyl 1-(2-bromoethyl)-4-phenyl-4-piperidyl ketone, ethyl 1-(2-chloropropyl)-4-phenyl-4-piperidyl ketone, isobutyl 1-(2-chloropropyl)-4-phenyl-4-piperidyl ketone, n-hexyl 1-(3-chloropropyl)-4-phenyl-4-piperidyl ketone, and the like. These compounds can be isolated in their free base form or in the form of their acid-addition salts, preferably the hydrochlorides.

C. *Lower-alkyl 1 - [(monocarbocyclic - aryl)amino (polycarbon - lower - alkyl)] - 4 - phenyl - 4 - piperidyl ketones.*—The preparation of these compounds is illustrated by the following preparation of ethyl 1-[2-(4-chlorophenylamino)ethyl]-4-phenyl-4-piperidyl ketone in free base and acid-addition salt forms: A mixture containing 6.32 g. of ethyl 1-(2-chloroethyl)-4-phenyl-4-piperidyl ketone hoydrochloride, 10.24 g. of para-chloroaniline and 50 cc. of 2-ethoxyethanol was refluxed for sixteen hours and then chilled in a refrigerator. The solid that separated was collected and recrystallized several times from absolute ethanol, yielding 5.8 g. (71.3% yield) of ethyl 1 - [2 - (4 - chlorophenylamino)ethyl] - 4 - phenyl-4-piperidyl ketone as its hydrochloride, M.P. 229.2–230.8° C. (corr.) when dried in vacuo at 70° C.

*Analysis.*—Calcd. for $C_{22}H_{27}ClN_2O \cdot HCl$: Cl, 17.41; N, 6.88. Found: Cl, 17.61; N, 6.82.

Ethyl 1 - [2 - (4 - chlorophenylamino)ethyl]-4-phenyl-4-piperidyl ketone in free base form is prepared from its hydrochloride according to the procedure described above in Example 1C for the conversion of ethyl 1-(2-phenylaminoethyl)-4-phenyl-4-piperidyl ketone hydrochloride into its free base.

Ethyl 1 - [2 - (4 - chlorophenylamino)ethyl]-4-phenyl-4-piperidyl ketone also can be prepared following the procedure described in Example 1C using ethyl 4-phenyl-4-piperidyl ketone and 2-(4-chlorophenylamino)ethyl bromide.

Other representative lower-alkyl 1-[(monocarbocyclic-aryl)amino - (polycarbon - lower - alkyl)] - 4 - phenyl-4-piperidyl ketones that can be prepared following the above procedure of Example 15C for the preparation of ethyl 1-[2-(4-chlorophenylamino)ethyl]-4-phenyl-4-piperidyl ketone using the appropriate lower-alkyl 1-[halo(polycarbon-lower-alkyl)]-4-phenyl - 4 - piperidyl ketone and monocarbocyclic-arylamine are the following compounds of Examples 16–22, inclusive. These compounds can be isolated in their free base form or in the form of their acid-addition salts, preferably their hydrochlorides, as illustrated.

Example 16

Ethyl 1 - [2 - (4 - ethoxyphenylamino)ethyl] - 4 - phenyl-4-piperidyl ketone hydrochloride is obtained following the procedure described in Example 15C using ethyl 1-(2-chloroethyl)-4-phenyl-4-piperidyl ketone and 4-ethoxyaniline.

Example 17

Ethyl 1 - [2 - (2,4 - dichlorophenylamino)ethyl] - 4-phenyl-4-piperidyl ketone hydrochloride is obtained following the procedure described in Example 15C using ethyl 1-(2-chloroethyl)-4-phenyl-4-piperidyl ketone and 2,4-dichloroaniline.

Example 18

Methyl 1 - [4 - (3,4 - dimethoxyphenylamino)butyl]-4-phenyl-4-piperidyl ketone hydrochloride is obtained following the procedure described in Example 15C using methyl 1-(4-chlorobutyl)-4-phenyl-4-piperidyl ketone and 3,4-dimethoxyaniline.

Example 19

Ethyl 1 - [3 - (4 - n - hexoxyphenylamino)propyl] - 4-phenyl-4-piperidyl ketone hydrochloride is obtained following the procedure described in Example 15C using ethyl 1-(3-chloropropyl)-4-phenyl-4-piperidyl ketone and 4-n-hexoxyaniline.

Example 20

Ethyl 1 - [2 - (4 - acetylaminophenylamino)ethyl] - 4-phenyl-4-piperidyl ketone hydrochloride is obtained following the procedure described in Example 15C using ethyl 1-(2-bromoethyl)-4-phenyl-4-piperidyl ketone and 4-acetylaminoaniline.

Example 21

Isobutyl 1 - [2 - (phenylamino)propyl] - 4 - phenyl - 4-piperidyl ketone hydrochloride is obtained following the procedure described in Example 15C using isobutyl 1-(2-chloropropyl)-4-phenyl-4-piperidyl ketone and aniline.

Example 22 n-Hexyl 1 - [3 - (4 - n - butylaminophenylamino)propyl]-4-phenyl-4-piperidyl ketone hydrochloride is obtained following the procedure described in Example 15C using n-hexyl 1-(3-chloropropyl)-4-phenyl-4-piperidyl ketone and 4-n-butylaminoaniline.

Examle 23

*Ethyl 1 - [2 - (4 - nitrophenylamino)ethyl] - 4 - phenyl-4-piperidyl ketone.*—This preparation was carried out following the procedure described in Example 15C using 24.7 g. of ethyl 1-(2-chloroethyl)-4-phenyl-4-piperidyl ketone hydrochloride, 43 g. of para-nitroaniline in 190 cc. of 2-ethoxyethanol. There was thus obtained 9.4 g. (29% yield) of ethyl 1-[2-(4-nitrophenylamino)-ethyl]-4-phenyl-4-piperidyl ketone as its hydrochloride, M.P. 219.6–221.6° C. (corr.) when recrystallized twice from methanol and dried in vacuo at 65° C.

*Analysis.*—Calcd. for $C_{22}H_{27}N_3O_3 \cdot HCl$: Cl, 8.49; N, 10.06. Found: Cl, 8.48; N, 9.93.

Ethyl 1-[2-(4-nitrophenylamino)ethyl]-4-phenyl-4-piperidyl ketone in free base form is prepared from its hydrochloride according to the procedure described above in Example 1C for the conversion of ethyl 1-(2-phenylaminoethyl)-4-phenyl-4-piperidyl ketone hydrochloride into its free base.

Example 24

Ethyl 1-[3-(4-nitrophenylamino)propyl]-4-phenyl-4-piperidyl ketone hydrochloride is obtained following the procedure described in Example 15C using ethyl 1-(3-chloropropyl)-4-phenyl-4-piperidyl ketone and para-nitroaniline.

Example 25

Ethyl 1-[4-(4-nitrophenylamino)butyl]-4-phenyl-4-piperidyl ketone hydrochloride is obtained following the procedure described in Example 15C using ethyl 1-(4-chlorobutyl)-4-phenyl-4-piperidyl ketone and para-nitroaniline.

Example 26

Ethyl 1-[2-(4-aminophenylamino)ethyl]-4-phenyl-4-piperidyl ketone hydrochloride is obtained by reacting ethyl 1-[2-(4-nitrophenylamino)ethyl]-4-phenyl-4-piperidyl ketone hydrochloride with a reducing agent effective to reduce nitro groups to amino groups. Alternatively, ethyl 1-[2-(4-aminophenylamino)ethyl]-4-phenyl - 4 - piperidyl ketone hydrochloride can be obtained following the procedure described in Example 1C using ethyl 4-phenyl-4-piperidyl ketone and 2-(4-aminophenylamino)ethyl bromide.

Example 27

Ethyl 1-[3-(4-aminophenylamino)propyl]-4-phenyl-4-piperidyl ketone hydrochloride is obtained by reacting ethyl 1-[3-(4-nitrophenylamino)propyl]-4-phenyl - 4 - piperidyl ketone hydrochloride with a reducing agent effective to reduce nitro groups to amino groups. Alternatively, ethyl 1-[3-(4-aminophenylamino)propyl]-4-phenyl-4-piperidyl ketone hydrochloride can be obtained following the procedure described in Example 1C using ethyl 4-phenyl - 4 - piperidyl ketone and 3 - (4 - aminophenylamino)propyl chloride.

Example 28

Ethyl 1 - [4 - (4 - aminophenylamino)butyl] - 4-phenyl - 4 - piperidyl ketone hydrochloride is obtained by reacting ethyl 1-[4-(4-nitrophenylamino)butyl]-4-phenyl-4-piperidyl ketone hydrochloride with a reducing agent effective to reduce nitro groups to amino groups. Alternatively, ethyl 1 - [4 - (4 - aminophenylamino)-butyl]-4-phenyl-4-piperidyl ketone hydrochloride can be obtained following the procedure described in Example 1C using ethyl 4-phenyl-4-piperidyl ketone and 4-(4-aminophenylamino)butyl bromide.

Example 29

*n-Propyl 1-(2-phenylaminoethyl)-4-phenyl-4-piperidyl-ketone.*—This preparation was carried out following the procedure described in Example 1C using 4.62 g. of n-propyl 4-phenyl-4-piperidyl ketone, 5.9 g. of 2-phenyl-aminoethyl bromide hydrobromide, 6 g. of sodium carbonate and 40 cc. of n-butanol. There was thus obtained 3.0 g. of the product, n-propyl 1,(2-phenylamino-ethyl)-4-phenyl-4-piperidyl ketone hydrochloride, M.P. 209.0–210.8° C. (corr.) when recrystallized once from water-ethanol and several times from absolute ethanol.

*Analysis.*—Calcd. for $C_{23}H_{30}N_2O \cdot HCl$: Cl, 9.16; N, 7.24. Found: Cl, 9.05; N, 7.23.

n-Propyl 1-(2-phenylaminoethyl)-4-phenyl-4-piperidyl ketone in free base form is prepared from its hydrochloride according to the procedure described above in Example 1C for the conversion of ethyl 1-(2-phenylamino-ethyl)-4-phenyl-4-piperidyl ketone hydrochloride into its free base.

Pharmacological evaluation of n-propyl 1-(2-phenyl-aminoethyl)-4-phenyl-4-piperidyl ketone hydrochloride in aqueous solution administered subcutaneously by the rat thermal stimulus method of Bass and Vander Brook has shown that this compound is approximately nine times as active an analgesic as meperidine hydrochloride.

The intermediate n-propyl 4-phenyl-4-piperidyl ketone was prepared following the procedure described in Example 1B using 81.1 g. of n-propyl 1-benzyl-4-phenyl-4-piperidyl ketone, 1.25 g. of palladium chloride and, as the solvent, 300 cc. of acetic acid. There was thus obtained 41.0 g. of n-propyl 4-phenyl-4-piperidyl ketone, B.P. 90–110° C. at 0.1 mm. The hydrochloride of this compound melted at 165–166° C. when recrystallized from methanol-ethyl acetate.

*Analysis.*—Calcd. for $C_{15}H_{21}NO \cdot HCl$: N, 6.06. Found: N, 6.13.

The intermediate n-propyl 1-benzyl-4-phenyl-4-piperidyl ketone was prepared following the procedure described in Example 1A using 104.2 g. of 1-benzyl-4- cyano-4-phenylpiperidine hydrochloride, 123.0 g. of n-propyl bromide, 24.3 g. of magnesium, 700 cc. of ether and 300 cc. of toluene. There was thus obtained 91.3 g. of n-propyl 1-benzyl-4-phenyl-4-piperidyl ketone, a solid. A 4.0 g. portion of this solid was dissolved in ether, the solution filtered and to the filtrate was added a solution of hydrogen chloride in ether. The resulting precipitate was collected and recrystallized from isopropyl alcohol to yield 2.3 g. of n-propyl 1-benzyl-4-phenyl-4-piperidyl ketone hydrochloride, M.P. 227–230° C.

*Analysis.*—Calcd. for $C_{22}H_{27}NO \cdot HCl$: C, 73.82; H, 7.89; Cl, 9.91. Found: C, 74.18; H, 7.65; Cl, 9.98.

My lower-alkyl 1,[(monocarbocyclic-aryl)amino-polycarbon-lower-alkyl)]-4-phenyl-4-piperidyl ketones can be formulated in the manner conventional for potent analgesics, e.g., in liquid preparation in an aqueous or aqueous-ethanol menstrum, or in solid form, e.g., as tablets or powders. The tablet formulations can be prepared using conventional excipients; and the powder can be formulated in capsule form. These preparations can be administered orally or, in the case of the aqueous preparations, intramuscularly or intravaneously.

I claim:

1. A member of the group consisting of compounds of the formula

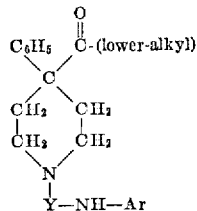

where $C_6H_5$ is phenyl, Y is alkylene having from two to six carbon atoms, lower-alkyl has from one to six carbon atoms, and Ar is selected from the group consisting of unsubstituted-phenyl and phenyl substituted by from one to three substituents selected from nitro, amino, (lower-alkyl)amino, (lower-alkanoyl)amino, lower-alkoxy, lower-alkylmercapto, lower-alkylsulfonyl, hydroxy and halo; and their acid-addition salts.

2. A member of the group consisting of ethyl 1-(2-phenylaminoethyl)-4-phenyl-4-piperidyl ketone and its acid-addition salts.

3. A member of the group consisting of ethyl-1(3-phenylaminopropyl)-4-phenyl-4-piperidyl ketone and its acid-addition salts.

4. A member of the group consisting of n-propyl 1-(2-phenylaminoethyl)-4-phenyl-4-piperidyl ketone and its acid-addition salts.

5. A member of the group consisting of ethyl 1-[2-(4-nitrophenylamino)ethyl]-4-phenyl-4-piperidyl ketone and its acid-addition salts.

6. A member of the group consisting of lower-alkyl 1-[halo-(polycarbon - lower - alkyl)] - 4 - phenyl - 4 - piperidyl ketone where "polycarbon-lower-alkyl" means alkylene radicals having from two to six carbon atoms and acid-addition salts thereof.

7. A member of the group consisting of lower-alkyl 1 - [chloro - (polycarbon - lower - alkyl)] - 4 - phenyl 4-piperidyl ketone where "polycarbon-lower-alkyl" means alkylene radicals having from two to six carbon atoms and acid-addition salts thereof.

8. A member of the group consisting of lower-alkyl 1 - (2 - chloroethyl) - 4 - phenyl - 4 - piperidyl ketone and acid-addition salts thereof.

9. A compound selected from the group consisting of ethyl 1 - (2 - chloroethyl) - 4 - phenyl - 4 - piperidyl ketone and its acid-addition salts.

References Cited in the file of this patent

UNITED STATES PATENTS

| | | |
|---|---|---|
| 2,248,018 | Eisleb | July 1, 1941 |
| 2,687,414 | Cusic | Aug. 24, 1954 |
| 2,795,581 | Stern | June 11, 1957 |
| 2,859,316 | Morren | Oct. 28, 1958 |

UNITED STATES PATENT OFFICE
CERTIFICATE OF CORRECTION

Patent No. 3,096,335                        July 2, 1963

Bill Elpern

It is hereby certified that error appears in the above numbered patent requiring correction and that the said Letters Patent should read as corrected below.

Column 2, line 70, for "(polycarbon-lower alkyl)" read -- (polycarbon-lower-alkyl) --; column 3, line 26, for "enthanesulfonic" read -- ethanesulfonic --; line 63, for "The solution" read -- The toluene solution --; column 5, line 11, for "strated" read -- started --; line 12, for "crytals" read -- crystals --; line 15, for "211-212.8° C." read -- 211.2-212.8° C. --; line 57, for "than" read -- that --; line 61, for "(polycarbon-lower-alkyl" read -- (polycarbon-lower-alkyl) --; column 6, line 1, for "3-phenyl-4-" read -- 4-phenyl-4- --; column 7, line 26, for "ethanolethyl" read -- ethanol-ethyl --; column 8, line 4, for "slats" read -- salts --; line 8, for "chlorethyl)" read -- chloroethyl) --; line 39, for "hoydrochloride" read -- hydrochloride --; column 10, line 44, for "1,(2-" read -- 1-(2- --; column 11, line 13, for "1,[" read -- 1-[ --.

Signed and sealed this 12th day of May 1964.

(SEAL)
Attest:

ERNEST W. SWIDER                           EDWARD J. BRENNER

Attesting Officer                          Commissioner of Patents